United States Patent
Lee

(10) Patent No.: US 10,255,812 B2
(45) Date of Patent: Apr. 9, 2019

(54) METHOD AND APPARATUS FOR PREVENTING COLLISION BETWEEN OBJECTS

(71) Applicant: SAMSUNG ELECTRONICS CO., LTD., Suwon-si (KR)

(72) Inventor: Dongwook Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/678,358

(22) Filed: Aug. 16, 2017

(65) Prior Publication Data
US 2018/0151077 A1  May 31, 2018

(30) Foreign Application Priority Data

Nov. 29, 2016  (KR) .................. 10-2016-0160863

(51) Int. Cl.
*G08G 1/16* (2006.01)
*B60Q 1/52* (2006.01)
(Continued)

(52) U.S. Cl.
CPC ............. *G08G 1/166* (2013.01); *B60Q 1/525* (2013.01); *B60Q 5/006* (2013.01); *B60Q 9/008* (2013.01); *B60W 30/09* (2013.01); *B60W 30/0956* (2013.01); *G08G 1/161* (2013.01); *G08G 1/162* (2013.01); *B60W 2550/10* (2013.01)

(58) Field of Classification Search
USPC ........................................................ 701/301
See application file for complete search history.

(56) References Cited

U.S. PATENT DOCUMENTS 7,124,027 B1 * 10/2006 Ernst, Jr. ............... B60W 30/09
701/301
7,840,355 B2  11/2010 Breed et al.
(Continued)

FOREIGN PATENT DOCUMENTS

EP           1157913 A2   11/2001
JP        2002-260199 A    9/2002
(Continued)

OTHER PUBLICATIONS

Lee, Yunhee. Et al., "Stereo Vision based Forward Collision Warning and Avoidance System." The Korean Society of Automotive Engineers 2006 Annual Spring Conference (2006): 1638-2646.
(Continued)

*Primary Examiner* — Tyler D Paige
(74) *Attorney, Agent, or Firm* — Sughrue Mion, PLLC

(57) ABSTRACT

Disclosed are collision preventing apparatuses and methods for a vehicle. The collision preventing apparatus estimate whether objects located in a vicinity of the vehicle may collide with each other based on data collected from a sensor in the vehicle, determine a trajectory of each of the objects, verify whether the estimated trajectories intersect, determine that the objects may collide with each other in response to the estimated trajectories overlapping, inform each of the objects of a collision risk when the objects may collide with each other, and differently perform an operation of informing the objects of the collision risk based on a collision level of each of the objects.

20 Claims, 6 Drawing Sheets

(51) Int. Cl.
B60W 30/09 (2012.01)
B60W 30/095 (2012.01)
B60Q 9/00 (2006.01)
B60Q 5/00 (2006.01)

(56) References Cited

U.S. PATENT DOCUMENTS

| | | | |
|---|---|---|---|
| 8,767,186 B2 | 7/2014 | Lu et al. | |
| 2005/0137786 A1* | 6/2005 | Breed | B60N 2/2863 701/482 |
| 2006/0031015 A1* | 2/2006 | Paradie | G06K 9/00805 701/301 |
| 2008/0147253 A1* | 6/2008 | Breed | B60W 30/16 701/3 |
| 2010/0228419 A1* | 9/2010 | Lee | B60W 30/0953 701/25 |
| 2010/0328644 A1* | 12/2010 | Lu | G01S 7/4802 356/5.01 |
| 2011/0178710 A1* | 7/2011 | Pilutti | B60T 7/22 701/301 |
| 2014/0207325 A1* | 7/2014 | Mudalige | B62D 15/025 701/26 |
| 2015/0243044 A1* | 8/2015 | Luo | G06T 7/2033 382/107 |
| 2015/0302751 A1* | 10/2015 | Strauss | B60T 7/22 701/41 |
| 2017/0225689 A1* | 8/2017 | Mukai | B60W 50/0097 |
| 2017/0243071 A1* | 8/2017 | Stein | G06K 9/00805 |
| 2018/0151077 A1* | 5/2018 | Lee | G08G 1/166 |

FOREIGN PATENT DOCUMENTS

| | | |
|---|---|---|
| JP | 3744314 B2 | 2/2006 |
| JP | 4528904 B2 | 8/2010 |
| JP | 4597428 B2 | 12/2010 |
| JP | 2011-090543 A | 5/2011 |
| JP | 4940767 B2 | 5/2012 |
| JP | 5150527 B2 | 2/2013 |
| JP | 5469138 B2 | 4/2014 |
| KR | 10-0851831 B1 | 8/2008 |
| KR | 10-1231510 B1 | 2/2013 |
| WO | WO 2016/060384 A1 | 4/2016 |

OTHER PUBLICATIONS

Choi, Baehoon, et al., "Location estimation and obstacle tracking using laser scanner for indoor mobile robots." Journal of Korean Institute of Intelligent Systems 21.3 (2011): 329-334.

Lee, S.H., et al., "Implementation of Low-Speed Short-Distance Collision Warning Algorithm based on Sensor Fusion." Korean Society for Precision Engineering 2011 Annual Autumn Conference (2011): 43-44.

\* cited by examiner

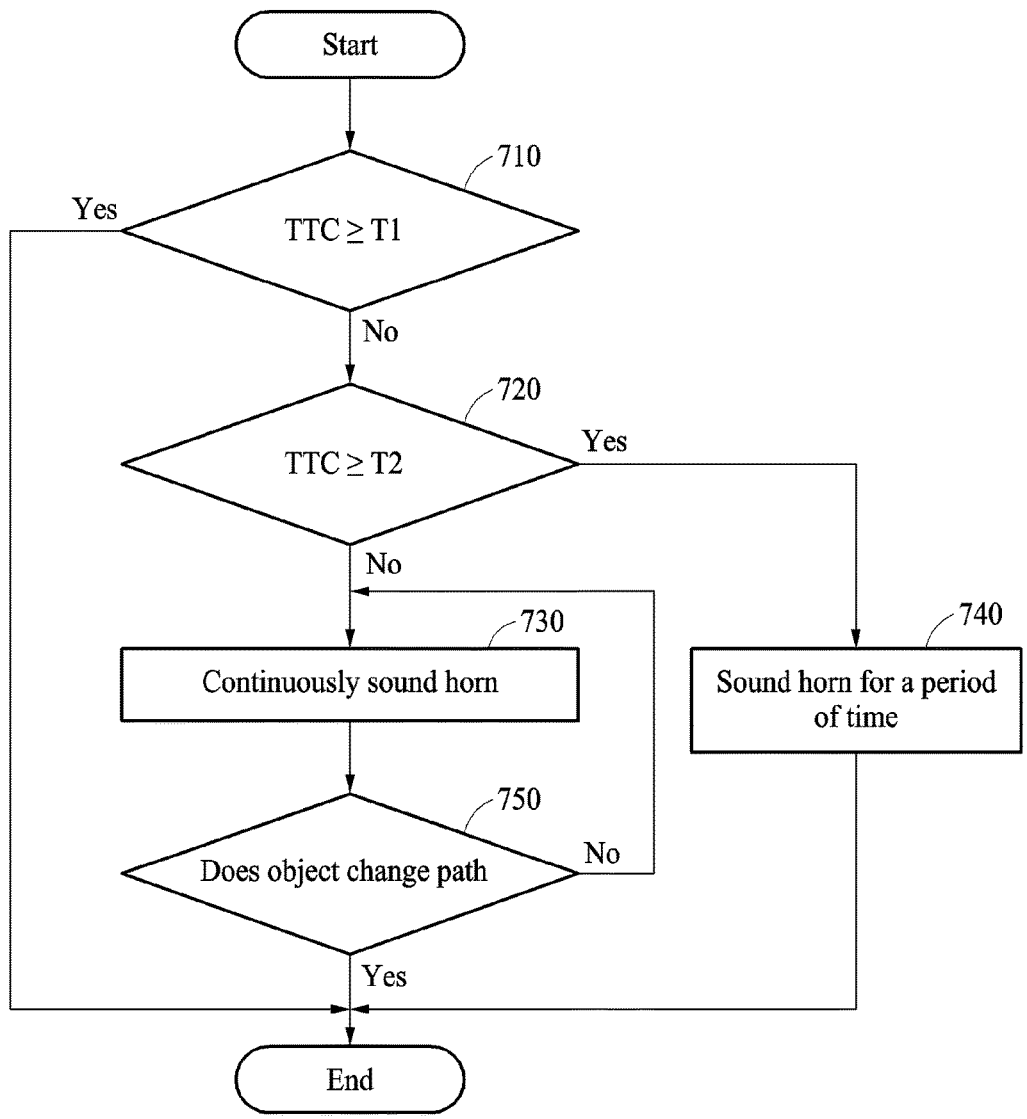

METHOD AND APPARATUS FOR PREVENTING COLLISION BETWEEN OBJECTS

CROSS-REFERENCE TO RELATED APPLICATION(S)

This application claims the benefit under 35 USC § 119(a) of Korean Patent Application No. 10-2016-0160863 filed on Nov. 29, 2016, in the Korean Intellectual Property Office, the entire disclosure of which is incorporated herein by reference for all purposes.

BACKGROUND

1. Field

The following description relates to a method of preventing a collision and a collision preventing apparatus included in a vehicle.

2. Description of Related Art

While driving, a vehicle may collide with a neighboring vehicle due to poor visibility or driver carelessness. Traffic accidents occur, for example, when a moving vehicle strays from a lane, or a moving vehicle collides with another vehicle due to poor visibility and the driver's lack of concentration. The driver's lack of concentration may stem from fatigue during long-distance driving or nighttime driving. The poor visibility may arise due to factors, such as rainy weather. An advanced driver assistance system (ADAS) performs collision warning, collision avoidance, and speed control to prevent traffic accidents. The ADAS may prevent a traffic accident by providing driving information, a danger warning, or intervening by assisting with driving a vehicle so that a driver may travel more conveniently or safely.

For ADAS systems, research is being done on a lane departure prevention system and an intelligent speed control system that actively steers or controls a speed in an assistance information generating system such as a rear parking warning system, a lane departure warning system, a drowsy driving warning system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of preventing a collision, the method including tracking objects located in a vicinity of a vehicle based on data collected from a sensor in the vehicle, determining a trajectory of each of the objects, verifying a collision level of each of the objects based on the determined trajectory, and performing a collision prevention operation based on the collision level.

The determining may include determining the trajectory based on a moving path of each of the objects obtained by the tracking of the objects and a curvature of a road on which the objects are located.

The verifying may include verifying the collision level based on whether trajectories of at least two objects of the objects overlap.

The verifying may include verifying the collision level based on a probability that each of the objects is to follow the trajectory.

The performing of the collision prevention operation may include determining a field of view of each of the objects, and informing an object of the objects of a collision risk based on whether another object the objects is present in the determined field of view of the object.

The performing of the collision prevention operation may include determining a time to collision (TTC) between the object and another object, in response to another object not being in each of the determined field of view of the object, and changing a path of the vehicle or informing each of the objects of the collision risk based on the determined TTC.

The performing of the collision prevention operation may include informing the objects of a collision risk, determining, based on the sensor data, whether an object of the objects does not follow the trajectory, in response to the objects being informed of the collision risk, and discontinuing the informing of the objects of the collision risk, in response to the object not following the trajectory.

The performing of the collision prevention operation may include any one or any combination of changing a path of the vehicle based on the collision level or informing an object of the objects of a collision risk.

The changing of the path of the vehicle may include changing the path of the vehicle based on a point at which trajectories of at least two objects of the objects intersect.

In another general aspect, there is provided collision preventing apparatus including a processor configured to track objects located in a vicinity of a vehicle based on data collected from a sensor in the vehicle, determine a trajectory of each of the objects, verify a collision level of each of the objects based on the determined trajectory, and perform a collision prevention operation based on the collision level.

The processor may be configured to verify the collision level based on whether trajectories of at least two objects of the objects overlap.

The processor may be configured to determine a field of view of each of the objects, determine whether an object of the objects detect another object of the objects based on the determined fields of view, and inform each of the objects of the collision risk in response to the object being unable to detect another object.

The processor may be configured to change a path of the vehicle to avoid a point at which the trajectories of at least two objects of the objects intersect.

In another general aspect, there is provided a method of preventing a collision, the method including obtaining locations, at different times, of objects located in a vicinity of a vehicle from a sensor in the vehicle, determining trajectories of each of the objects based on the obtained locations of the each of the objects, verifying whether at least two of the trajectories intersect, determining a time to collision (TTC) of each of the objects, in response to the at least two trajectories intersecting, and informing the objects of a collision risk based on the determined TTC.

The determining of the TTC may include determining the TTC in response to an object corresponding to any of the at least two trajectories being unable to detect another object corresponding to any of the at least two trajectories.

The informing the objects of the collision risk may include determining whether to inform each of the objects of the collision risk by comparing the determined TTC to a TTC threshold.

The may include changing a path of the vehicle in response to the TTC being less than or equal to a TTC threshold.

The verifying may include verifying whether the portion of the at least two of the trajectories overlap based on a braking distance and a speed of each of the objects corresponding to the at least two trajectories.

The method may include determining whether an object corresponding to any of the at least two trajectories has changed its path, and terminating the informing of the objects, in response to the path being changed.

Other features and aspects will be apparent from the following detailed description, the drawings, and the claims.

BRIEF DESCRIPTION OF THE DRAWINGS

FIG. 7 is a diagram illustrating an example of an operation in which a collision preventing apparatus informs each of objects of a collision risk.

Figure 1:
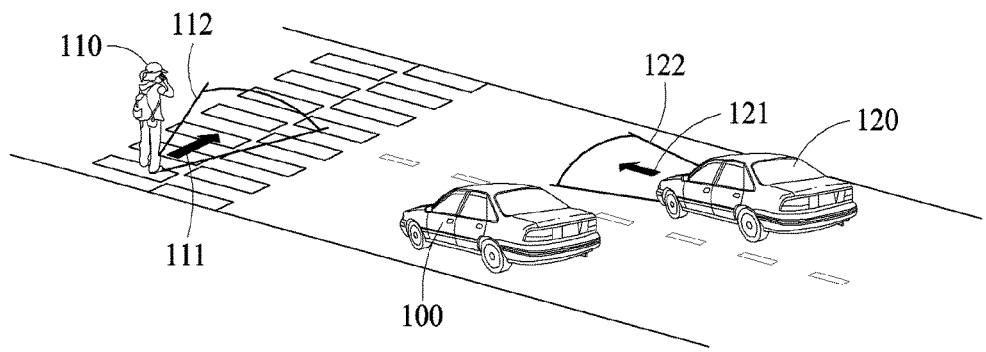
FIG. 1 illustrates an example of an operation in which a first vehicle including a collision preventing apparatus warns of a collision between objects.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. As used herein, the singular forms are intended to include the plural forms as well, unless the context clearly indicates otherwise.

Examples may be implemented as various types of products, for example, personal computers, laptop computers, tablet computers, smartphones, televisions, smart home appliances, intelligent vehicles, kiosks, and wearable devices. For example, the examples are applicable to user recognition by a smartphone, a mobile device, and a smart home system. The examples are applicable to a payment service requiring user recognition. Further, the examples are applicable to an intelligent automobile system which automatically starts up an engine after recognizing a user. Hereinafter, reference will now be made in detail to the examples with reference to the accompanying drawings, wherein like reference numerals refer to like elements throughout.

The following description provides example methods and apparatuses of preventing a collision. In the following description, a vehicle may be an automobile such as a car, a sport utility vehicle, or a truck. Additionally, a vehicle may be a motorcycle or a cycle. As another example, a vehicle may be a drone. However, a vehicle is not limited to the foregoing examples, and other types of vehicles are possible.

FIG. 1 illustrates an example of an operation in which a first vehicle 100 including a collision preventing apparatus warns of a collision between objects. The first vehicle 100 performs a method of preventing a collision. The first vehicle 100 includes a sensor configured to detect an object. The object is located in a vicinity of the first vehicle 100 and may collide with the first vehicle 100. For example, the object includes a person, a vehicle, and a bicycle.

FIG. 1 illustrates a person 110 and a second vehicle 120 located in the vicinity of the first vehicle 100. The collision preventing apparatus of the first vehicle 100 receives sensor data generated by the sensor. The collision preventing apparatus tracks, in real-time, a location of the person 110 and a location of the second vehicle 120 based on the received sensor data.

In an example, the collision preventing apparatus of the first vehicle 100 estimates whether objects located in the vicinity of the first vehicle 100 may collide with each other. Referring to FIG. 1, because the person 110 is crossing at a crosswalk and the second vehicle 120 is moving toward the crosswalk, the person 110 and the second vehicle 120 may collide with each other after a time period. The collision preventing apparatus warns the second vehicle 120 or the person 110 by estimating that the second vehicle 120 and the person 110 are to collide with each other after the time period.

In an example, the collision preventing apparatus estimates a trajectory of each of neighboring objects to estimate a collision between the neighboring objects. The estimated trajectory indicates a path a that the corresponding object may follow in the future. In an example, the collision preventing apparatus verifies whether sections or all of the estimated trajectories overlap or intersect by comparing the estimated trajectories. FIG. 1 illustrates an estimated trajectory 111 of the person 110 and an estimated trajectory 121 of the second vehicle 120. In an example, the collision preventing apparatus verifies whether the estimated trajectory 111 and the estimated trajectory 121 cross each other. If the estimated trajectory 111 and the estimated trajectory 121 cross each other, the collision preventing apparatus may estimate that the person 110 and the second vehicle 120 are to collide with each other. In an example, the collision preventing apparatus estimates whether objects may collides based on a braking distance of each of the objects and a probability that each of the objects is to follow the estimated trajectory.

When the collision preventing apparatus estimates that the objects located in the vicinity of the first vehicle 100 are to collide with each other, the collision preventing apparatus may inform each of the objects located in the vicinity of the first vehicle 100 of a collision risk. Referring to FIG. 1, the collision preventing apparatus may emit a warning light, such as, for example, a high beam, an emergency light, or a low beam, of the first vehicle 100 toward the person 110 or the second vehicle 120. In an example, the collision preventing apparatus may sound a horn of the first vehicle 100 toward the person 110 or the second vehicle 120. In response to a vehicle-to-vehicle (V2V) communication being possible, the collision preventing apparatus may transmit a message indicating the collision risk to the second vehicle 120.

In response to estimating that the objects located in the vicinity of the first vehicle 100 are to collide with each other, the collision preventing apparatus may verify whether the objects located in the vicinity of the first vehicle 100 detect each other. When the objects located in the vicinity of the first vehicle 100 are unable to detect each other, the collision preventing apparatus may inform each of the objects located in the vicinity of the first vehicle 100 of the collision risk. To verify whether the objects located in the vicinity of the first vehicle 100 detect each other, the collision preventing apparatus may estimate a field of view of each of the objects located in the vicinity of the first vehicle 100.

FIG. 1 illustrates a field of view 112 of the person 110 and a field of view 122 of the second vehicle 120 estimated by the collision preventing apparatus of the first vehicle 100. In an example, the collision preventing apparatus may determine a field of view of an object based on a type of the object. In an example, the collision preventing apparatus verifies whether the person 110 and the second vehicle 120 detect each other based on the field of view 112 and the field of view 122. When it is determined that the person 110 and the second vehicle 120 are able to detect each other, the collision preventing apparatus may not inform the person 110 or the second vehicle 120 of the collision risk although the estimated trajectory 111 and the estimated trajectory 121 cross each other. When the person 110 and the second vehicle 120 are unable to detect each other, and the estimated trajectory 111 and the estimated trajectory 121 cross each other, the collision preventing apparatus may inform any one or both of the person 110 and the second vehicle 120 of the collision risk. The collision preventing apparatus may attempt to prevent the collision between the objects located in the vicinity of the first vehicle 100.

In an example, the collision preventing apparatus changes a path of the first vehicle 100 based on the collision risk between the objects in the vicinity of the first vehicle 100. The collision preventing apparatus may control the path of the first vehicle 100 such that the first vehicle 100 avoids a point at which the person 100 and the second vehicle 120 may collide with each other. To control the path of the first vehicle 100, the collision preventing apparatus may be connected to another driver assistance system or an autonomous driving apparatus included in the first vehicle 100. The collision preventing apparatus may attempt to prevent a secondary accident caused by the first vehicle 100 by controlling the path of the first vehicle 100 to avoid the point at which the person 110 and the second vehicle 120 may collide with each other.

Figure 2:
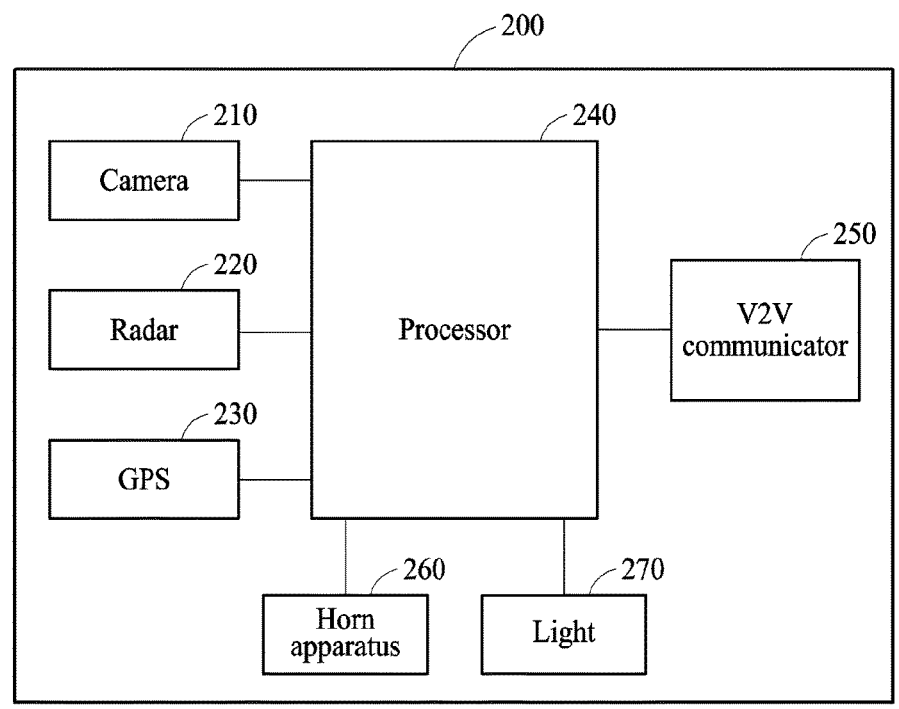
FIG. 2 is a diagram illustrating an example of a collision preventing apparatus.

FIG. 2 is a diagram illustrating an example of a collision preventing apparatus. Referring to FIG. 2, the collision preventing apparatus is included in a vehicle 200 and estimates whether objects located in a vicinity of the vehicle 200 may collide. Referring to FIG. 2, the collision preventing apparatus includes a processor 240. The collision preventing apparatus may be included as a part of a driver assistance system of the vehicle 200.

The collision preventing apparatus may be connected to at least one sensor included in the vehicle 200. Referring to FIG. 2, in an example, the vehicle 200 includes a camera 210, a radar 220, and a global positioning system (GPS) 230. In an example, the camera 210 is a device for photographing an image of a front of the vehicle 200, an image of a back of the vehicle 200, and an image of a side of the vehicle 200. The camera 210 may include a charge-coupled device (CCD). The radar 220 may be a radar such as, for example, a high-frequency radar or a lidar that detects a neighboring area of the vehicle 200. The GPS 230 detects coordinates of the vehicle 200 based on a latitude and a longitude.

The collision preventing apparatus identifies a moving object located in a vicinity of the vehicle 200 based on sensor data collected from at least one sensor. The collision preventing apparatus may track a plurality of objects located in the vicinity of the vehicle 200 based on the sensor data. The collision preventing apparatus may detect a change in locations of the objects located in the vicinity of the vehicle 200 as time elapses. The collision preventing apparatus may detect a location of each of the objects relative to the vehicle 200. The collision preventing apparatus may detect a location of the vehicle 200 in real-time using the GPS 230. The collision preventing apparatus may detect a path, such as a road, on which the vehicle 200 is located based on the location of the vehicle 200. The collision preventing apparatus may be connected to a map database or include the map database to detect the road on which the vehicle 200 is located.

In an example, the collision preventing apparatus estimates a movement of the vehicle 200 and movements of the objects in the vicinity of the vehicle 200. In an example, the collision preventing apparatus determines an estimated trajectory of each of the objects located in the vicinity of the vehicle 200. The collision preventing apparatus determine an estimated trajectory of the vehicle 200. In an example, the collision preventing apparatus verifies a collision level of each of the objects based on the determined estimated trajectory of each of the objects. The collision level is determined based on a degree to which estimated trajectories overlap. When the estimated trajectories overlap, in an example, the collision level is determined based on a time to collision (TTC) or a braking distance of each of the objects.

The collision level may be determined based on a probability that the objects collide with each other.

In an example, the collision preventing apparatus informs each of the objects of a collision risk based on the verified collision level. Referring to FIG. 2, in an example, the collision preventing apparatus informs each of the objects of the collision risk by controlling a horn apparatus 260 or a light 270 included in the vehicle 200. The light 270 includes at least one of a high beam, an emergency light, or a low beam. Referring to FIG. 2, in response to at least one of the objects being another vehicle, the collision preventing apparatus may inform another vehicle of the collision risk through a vehicle-to-vehicle (V2V) communicator 250. Thus, the collision preventing apparatus may estimate the collision between objects by identifying a movement of a moving object, for example, a vehicle, a bicycle, a motorcycle, or a person, located in the vicinity of the vehicle 200. In another example, the collision preventing apparatus may estimate the collision between a moving object and a stationary object located in the vicinity of the vehicle 200. In response to the collision being estimated, the collision preventing apparatus may inform each of neighboring objects of the collision risk.

The collision preventing apparatus may change a path of the vehicle 200 based on the verified collision level. In an example, the collision preventing apparatus estimates that the objects located in the vicinity of the vehicle 200 may collide and generates a path of the vehicle 200 considering the estimated collision between the objects located in the vicinity of the vehicle 200 when the probability of the objects colliding with each other is relatively great. The collision preventing apparatus may prevent a secondary collision by generating the path of the vehicle 200 considering the estimated collision between the objects located in the vicinity of the vehicle 200. Hereinafter, an operation of changing the path of the vehicle 200 and an operation of informing each of the objects of the collision risk, performed by the collision preventing apparatus based on the collision level is referred to as a corresponding operation.

Figure 3:
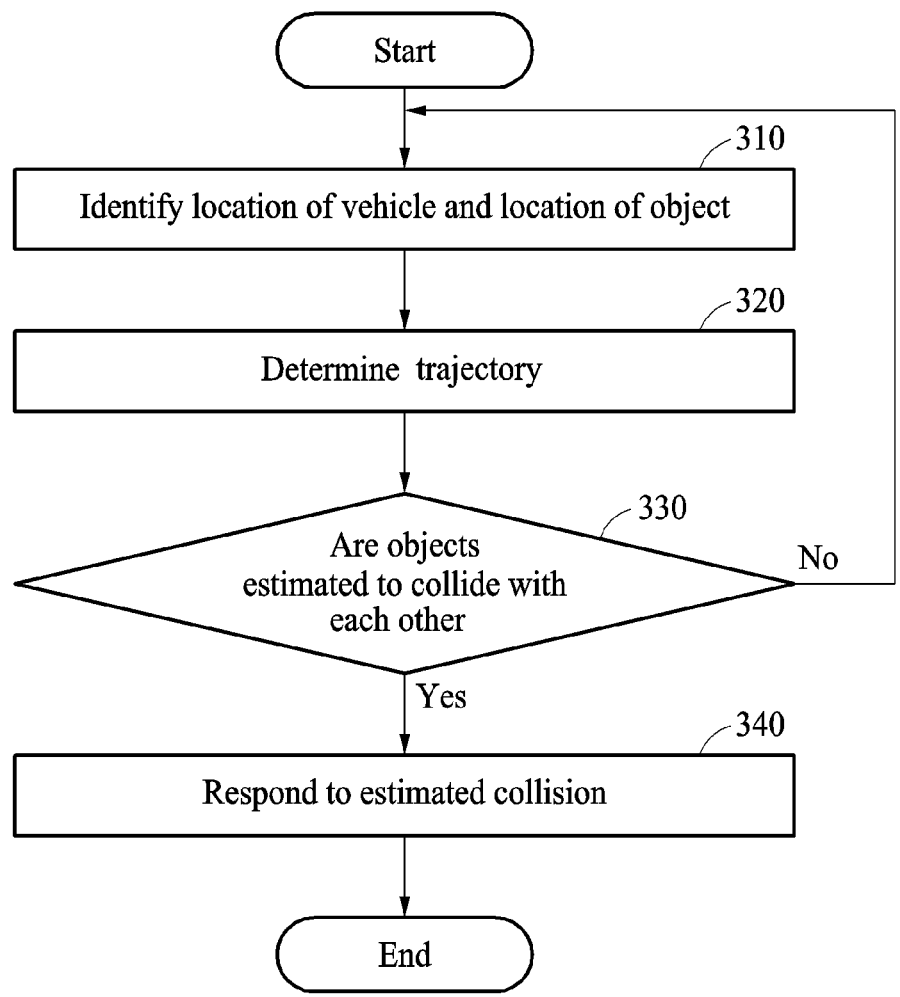
FIG. 3 is a diagram illustrating an example of an operation in which a collision preventing apparatus prevents a collision between objects located in a vicinity of a vehicle.

FIG. 3 is a diagram illustrating an example of an operation in which a collision preventing apparatus prevents a collision between objects located in a vicinity of a vehicle. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 is also applicable to FIG. 3, and are incorporated herein by reference. Thus, the above description may not be repeated here. In an example, the method of preventing the collision is executed by the processor 240 of FIG. 2.

Referring to FIG. 3, in 310, the collision preventing apparatus identifies a location of a vehicle and a location of one or more objects located in a vicinity of the vehicle. In an example, the collision preventing apparatus is included in the vehicle. In an example, the collision preventing apparatus identifies the location of the vehicle and the location of the object located in the vicinity of the vehicle based on sensor data generated by a sensor included in the vehicle. The collision preventing apparatus may search for information on a road on which the object and the vehicle are located based on the identified location of the vehicle. The collision preventing apparatus may identify a curvature of the road and a number of lanes of the road by searching for the information on the road.

When a plurality of objects are present in the vicinity of the vehicle, the collision preventing apparatus may identify a location of each of the objects. The collision preventing apparatus may obtain the location of each of the objects located in the vicinity of the vehicle from the sensor included in the vehicle as time elapses. The collision preventing apparatus may track the objects located in the vicinity of the vehicle. The collision preventing apparatus may collect temporal data for the movement of each of the objects and a movement of the vehicle.

Referring to FIG. 3, in 320, the collision preventing apparatus determines a trajectory of each of the objects. In an example, the trajectory of each of the objects is estimated based on the collected temporal data. That is, the collision preventing apparatus determines the estimated trajectory of each of the objects based on the obtained location of each of the objects. The collision preventing apparatus may determine a speed of each of the objects based on the temporal data. The collision preventing apparatus may determine the estimated trajectory based on the determined speed of each of the objects. The estimated trajectory may be determined based on a moving path of each of the objects and the curvature of the road on which the objects are located. The collision preventing apparatus may determine the estimated trajectory based on a type of each of the objects. The estimated trajectory may be determined for each one of the objects.

In an example, the collision preventing apparatus determines a probability that each of the objects is to follow the estimated trajectory. In an example, the collision preventing apparatus determines the estimated trajectory and the probability that each of the objects is to follow the estimated trajectory for each one of the objects. The probability that each of the objects is to follow the estimated trajectory may be determined based on the speed of each of the objects and the information on the road on which the objects are located.

Referring to FIG. 3, in 330, the collision preventing apparatus estimates whether the objects may collide with each other. The collision preventing apparatus may verify a collision level of each of the objects based on the determined estimated trajectory. The collision preventing apparatus may verify the collision level based on whether the estimated trajectories overlap with each other.

When the estimated trajectories overlap, in an example, the collision preventing apparatus determines a probability that the objects may collide with each other based on the probability that each of the objects will continue to follow the estimated trajectory. The probability that the objects may collide with each other may be determined based on the probability that all objects corresponding to the respective overlapping estimated trajectories are to follow the overlapping estimated trajectories.

When the estimated trajectories overlap, the collision preventing apparatus may detect a point at which the overlap occurs. The collision preventing apparatus may determine a time to collision (TTC) based on the point at which the estimated trajectories overlap and the speed of each of the objects. The TTC may be determined based on a braking distance of each of the objects.

Referring to FIG. 3, when it is estimated that the objects may collide with each other, in 340, the collision preventing apparatus proposes a response or responds. The collision preventing apparatus may perform an operation based on the collision level. In an example, the collision preventing apparatus informs each of the objects of a collision risk or changes a path of the vehicle.

When the collision preventing apparatus determines the probability that the objects may collide with each other, the collision preventing apparatus may determine which operation is to be performed by comparing the determined probability to a preset probability. In an example, the collision preventing apparatus gradationally performs the corresponding operation based on a value of the determined probability. For example, when the probability that the objects may collide with each other is greater than or equal to 0.6 and less than or equal to 0.8, the collision preventing apparatus may warn each of the objects of the collision risk. When the probability that the objects may collide with each other is greater than or equal to 0.8, the collision preventing apparatus may warn each of the objects of the collision risk and change the path of the vehicle based on the point at which the objects are estimated to collide with each other.

In an example, the collision preventing apparatus may inform each of the objects of the collision risk using a warning light or a horn included in the vehicle. When the vehicle being in being operation and is not being controlled by a driver, the collision preventing apparatus may generate a driving path of the vehicle based on the estimated collision of the objects. The vehicle may follow the generated moving path such that a secondary accident is prevented.

Figure 4:
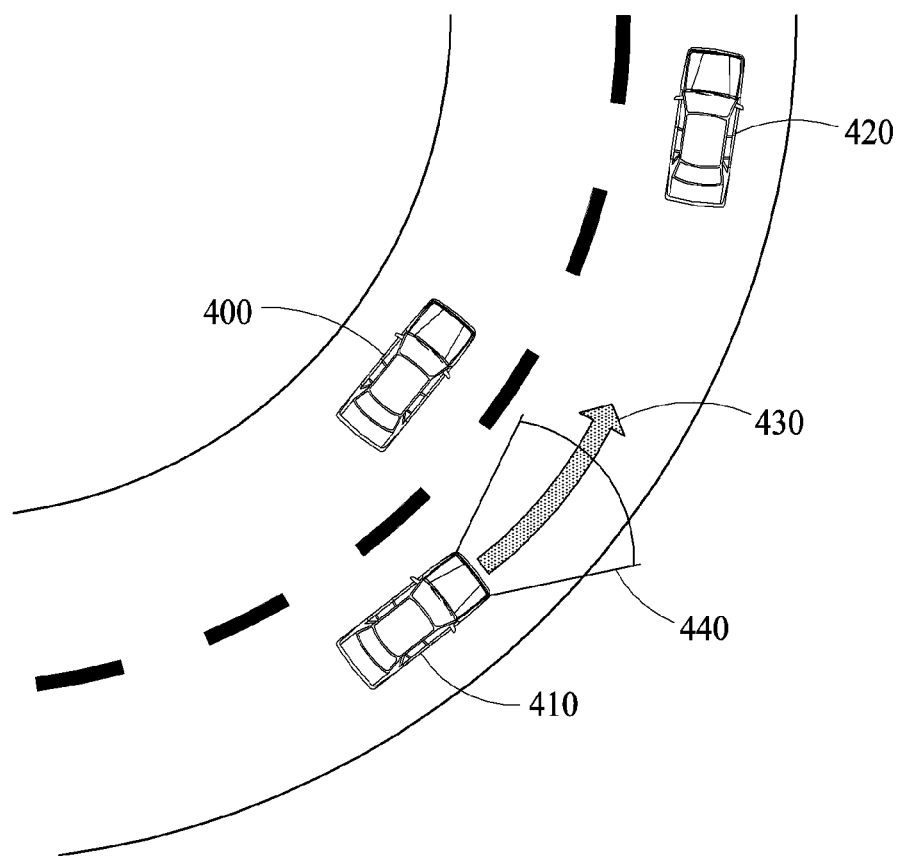
FIG. 4 illustrates an example of an operation in which a collision preventing apparatus warns objects located in a vicinity of a vehicle of a collision risk between the objects.

FIG. 4 illustrates an example of an operation in which a collision preventing apparatus warns objects 410 and 420 located in a vicinity of a vehicle 400 of a collision risk between the objects 410 and 420. Referring to FIG. 4, the vehicle 400 includes the collision preventing apparatus. In an example, the collision preventing apparatus generates temporal data for a location of the object 410 and a location of the object 420 by collecting the locations of the objects 410 and 420 located in the vicinity of the vehicle 400 as time elapses. Referring to FIG. 4, it is assumed that the objects 410 and 420 are vehicles and the object 420 stops in front of the object 410.

The collision preventing apparatus detects a speed of the object 410 and a location, i.e., a neighboring lane of the vehicle 400, of the object 410 relative to the vehicle 400. In an example, the collision preventing apparatus detects the location of the object 420 relative to the vehicle 400 and detect whether the object 420 stops. In an example, the collision preventing apparatus detects information on a road on which the vehicle 400 and the objects 410 and 420 are located based on coordinates of the vehicle 400. In another example, the collision preventing apparatus detects information on a road on which the vehicle 400 and the objects 410 and 420 are located based on coordinates of the objects 410 and 420. Referring to FIG. 4, the collision preventing apparatus may be aware of that the road is curved at an angle based on the coordinates of the vehicle 400 or the coordinates of one or both of the objects 410 and 420.

In an example, the collision preventing apparatus determines an estimated trajectory of each of the objects 410 and 420 located in the vicinity of the vehicle 400. The collision preventing apparatus determines an estimated trajectory 430 of the object 410 based on the temporal data for the object 410. The collision preventing apparatus may determine the estimated trajectory 430 based on information on the detected road. Referring to FIG. 4, in an example, the estimated trajectory 430 is determined based on a curvature of the road on which the object 410 moves. In an example, the collision preventing apparatus determines a probability that the object 410 follows the estimated trajectory 430. The collision preventing apparatus may estimate that the object 410 is to collide with the object 420 based on the estimated trajectory 430.

Referring to FIG. 4, the object 420 may be in a blind spot of the object 410 because a driver of the object 410 is unable to see a point at which the curve of the road ends. However, the vehicle 400 may detect both the objects 410 and 420. That is, the vehicle 400 is able to detect the object 420 before the object 410 detects the object 420. The object 410 may reduce a speed only after detecting the object 420. When a braking distance of the object 410 is shorter than a distance between the object 410 and the object 420, the object 410 may collide with the object 420. In an example, the collision preventing apparatus of the vehicle 400 prevents a situation in which the object 410 collides with the object 420 by informing the object 410 of the risk of collision with the object 420.

In an example, the collision preventing apparatus determines a field of view of each of the objects 410 and 420. The collision preventing apparatus verifies whether or not the objects 410 and 420 are in each other's field of view. In an example, the collision preventing apparatus verifies whether the objects 410 and 420 are in each other's blind spot.

FIG. 4 illustrates an example of a field of view 440 of the object 410 that is determined by the collision preventing apparatus. The collision preventing apparatus detects a type of the object 410 based on the sensor data. In an example, the collision preventing apparatus determines the field of view 440 based on the detected type of the object 410. In FIG. 4, because the object 410 is a vehicle, the collision preventing apparatus determines the field of view 440 based on a viewing angle of the vehicle. Because the object 410 is a vehicle, the collision preventing apparatus may determine the field of view 440 based on a distance that the driver is able to see. In an example, the collision preventing apparatus may determines the field of view 440 based on a detectable distance and an angle of view of a camera included in the object 410.

Because the estimated trajectory 430 crosses the object 420, the collision preventing apparatus may verify whether or not the object 410 is able to detect the object 420 based on the field of view 440. Referring to FIG. 4, the object 420 is present outside the field of view 440. In an example, the collision preventing apparatus calculates a point in time at which the object 420 comes in the field of view 440 of the object 410, which follows the estimated trajectory 430. In an example, the collision preventing apparatus determines the distance between the object 410 and the object 420 at the point in time at which the object 420 comes in the field of view 440. In an example, the collision preventing apparatus estimates an amount of time remaining until the object 410 stops or the braking distance of the object 410 based on the speed of the object 410. A distance that the object 410 moves until the object 410 stops may be determined based on the braking distance of the object 410 and a distance that the object 410 moves until the point in time at which the object 420 is in the field of view 440.

In response to the braking distance of the object 410 being shorter than the distance between the object 410 and the object 420, the collision preventing apparatus may become aware that a possibility of the object 410 colliding with the object 420 is relatively low. In this example, the collision preventing apparatus may not inform the object 410 or the object 420 of a collision risk. In an example, the collision preventing apparatus may sound a horn for an amount of time or turn on a warning light for a number of times. In an example, the horn may be sounded and the warning light may be turned on for a time period that does not exceed a threshold.

When the braking distance of the object 410 is longer than the distance between the object 410 and the object 420, the collision preventing apparatus may become aware that the possibility of the object 410 colliding with the object 420 is relatively high. In this example, the collision preventing apparatus may inform the object 410 or the object 420 of the collision risk. In an example, the collision preventing apparatus may sound the horn for a time period or turn on the warning light for a number of times. In an example, the horn may be sounded and the warning light may be turned on for a time period exceeding a threshold. In response to the object 410 or the object 420 supporting communication between vehicles, the collision preventing apparatus may broadcast a message indicating the collision risk. In an example, the collision preventing apparatus may control a movement of the vehicle 400 based on the estimated collision of the object 410 and the object 420. Referring to FIG. 4, the collision preventing apparatus may accelerate or stop the vehicle 400 based on the estimated collision of the object 410 and the object 420.

Figure 5:
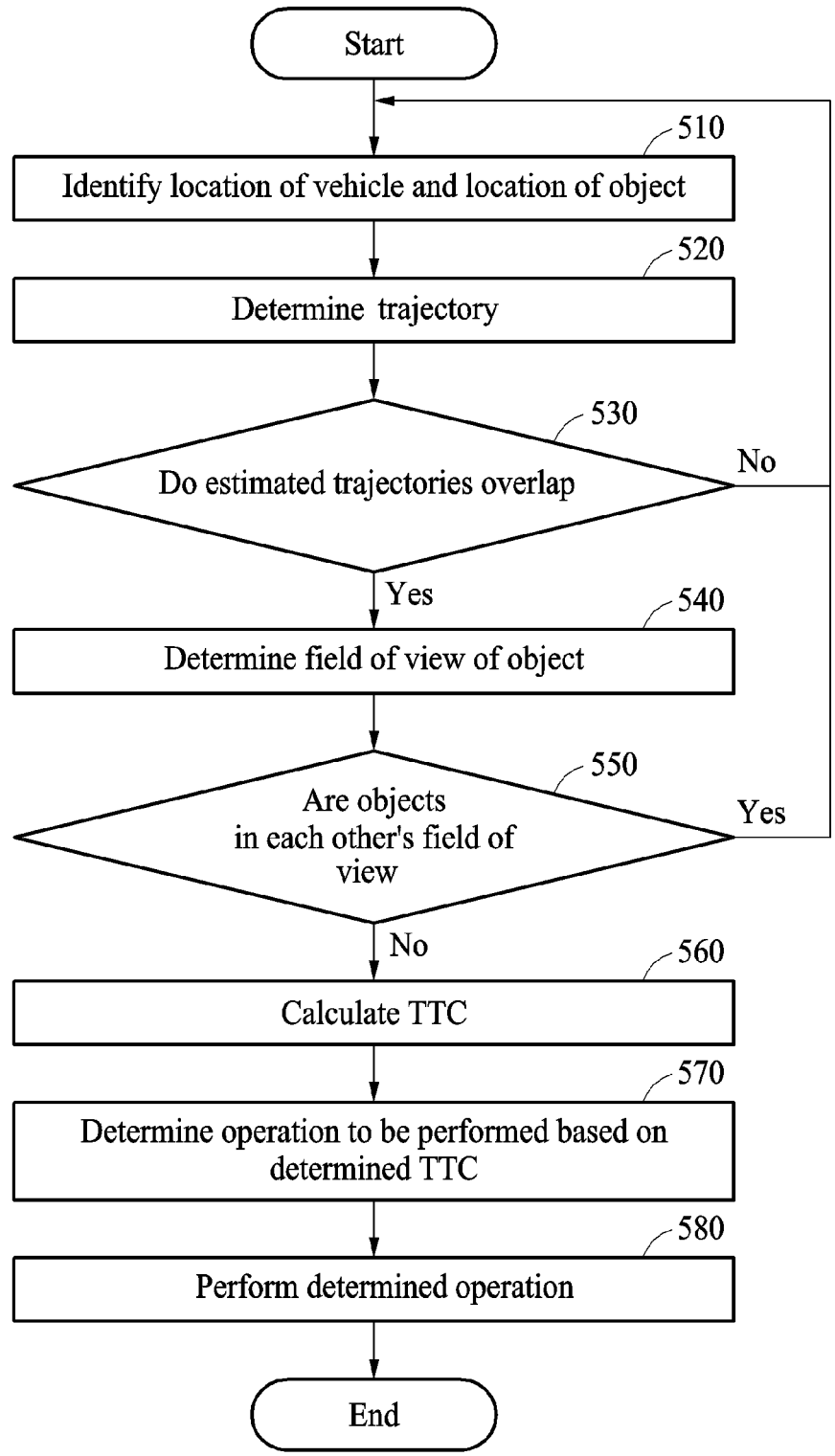
FIG. 5 is a diagram illustrating an example of an operation in which a collision preventing apparatus prevents a collision between objects based on a field of view of each of objects located in a vicinity of a vehicle.

FIG. 5 is a diagram illustrating an example of an operation in which a collision preventing apparatus prevents a collision between objects based on a field of view of each of the objects located in a vicinity of a vehicle. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in 510, the collision preventing apparatus identifies a location of a vehicle and a location of an object located in a vicinity of the vehicle based on sensor data of a sensor included in the vehicle. In an example, the collision preventing apparatus collects temporal data for a movement of the vehicle or a movement of the object. In an example, the collision preventing apparatus tracks at least one object located in the vicinity of the vehicle. In an example, the collision preventing apparatus may detect a location of the object relative to the vehicle and a moving speed of the object. In an example, the collision preventing apparatus detects a type of the object.

In 520, the collision preventing apparatus determines an estimated trajectory of the object. When a plurality of objects are located in the vicinity of the vehicle, the collision preventing apparatus determines an estimated trajectory of each of the objects. In an example, the collision preventing apparatus determines a moving direction or a moving speed of each of the objects based on the temporal data. In an example, the collision preventing apparatus may determine the estimated trajectory based on a curvature of a road on which the object moves and the determined moving direction or the determined moving speed.

In 530, the collision preventing apparatus verifies whether the estimated trajectories overlap by comparing the estimated trajectories of the objects in the vicinity of the vehicle. The collision preventing apparatus may search for a section in which the estimated trajectories overlap each other.

In 540, when the estimated trajectories overlap, the collision preventing apparatus determines a field of view of each of the objects. In an example, the collision preventing apparatus determines the field of view of each of the overlapping objects. In an example, the collision preventing apparatus models the field of view of the object based on the detected type of the object and the moving speed of the object.

In an example, the field of view of the object determined by the collision preventing apparatus is determined based on a maximum distance which is detectable by each of the object. For example, in response to the object being a vehicle, the collision preventing apparatus determines a field of view of the object by modeling a viewing angle of a driver of the vehicle and a distance that the driver is able to see based on the moving speed of the vehicle and the contours and curvature of the road that the vehicle is travelling on. In an example, when a camera is included in the vehicle, the collision preventing apparatus determines the field of view of the object based on an angle of view of the camera. When object is a person, the collision preventing apparatus determines the field of view of the object based on a viewing angle of the person.

In an example, the collision preventing apparatus determines whether to perform a corresponding operation based on a blind spot of each of the objects in which the estimated trajectories overlap. That is, the collision preventing apparatus determines whether the objects detect each other. In 550, the collision preventing apparatus determines whether the objects with estimated trajectories overlapping are in each other's field of view. In response to the objects being absent from each other's field of view, in an example, the collision preventing apparatus determines that the objects are located in each other's blind spot.

When the objects are located such that they are unable to detect each other, in an example, the collision preventing apparatus estimates a time to collision (TTC) of each of the objects. In 560, when the objects with the estimated trajectories overlapping are not in each other's field of view, the collision preventing apparatus calculates the TTC of each of the objects. In an example, the collision preventing apparatus determines the TTC of each of the objects based on the moving speed and the estimated trajectory of each of the objects.

In an example, the collision preventing apparatus determines the TTC based on a braking distance based on the moving speed of each of the objects. In an example, the collision preventing apparatus assumes that the objects with the estimated trajectories overlapping start to reduce speed at a point in time at which the objects detect each other. In this example, the collision preventing apparatus determines the TTC based on a distance that the objects move until the point in time at which the objects detect each other and the braking distance of each of the objects.

In 570, the collision preventing apparatus determines the one or more operations to be performed in response to a collision between the objects based on the determined TTC. In an example, the collision preventing apparatus compares the determined TTC to a TTC threshold. In an example, the collision preventing apparatus differently determines the operation based on a result of comparison between the determined TTC and the TTC threshold. Thus, the collision preventing apparatus varies a response level based on the TTC.

In 580, the collision preventing apparatus performs the determined operation. In an example, the collision preventing apparatus warns at least one of the objects of a collision risk or changes a path of the vehicle based on the determined corresponding operations. For example, an amount of time used for sounding a horn is determined differently based on whether the determined TTC exceeds the TTC threshold. In an example, the collision preventing apparatus adjusts the amount of time used for sounding the horn based on the determined amount of time. In response to the determined TTC being less than the preset TTC threshold, the path of the vehicle may be changed while the horn is being sounded.

Figure 6:
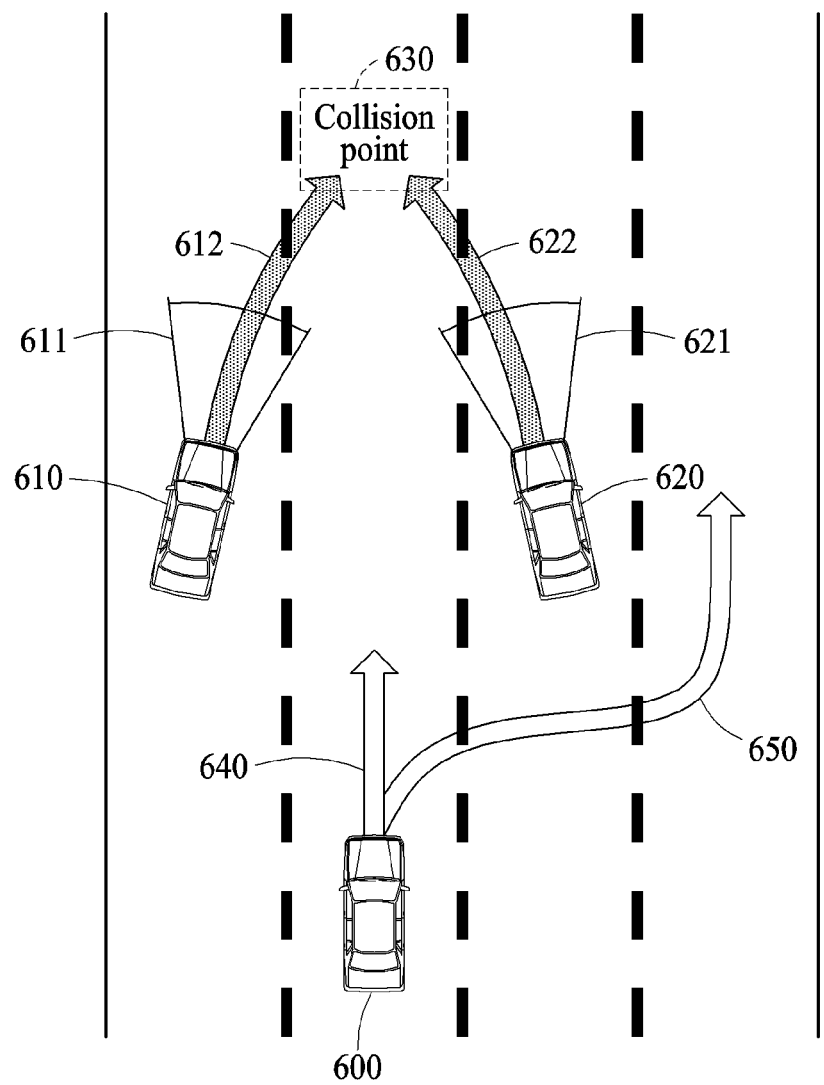
FIG. 6 illustrates an example of an operation in which a collision preventing apparatus estimates a collision between objects and changes a path of a vehicle based on the estimated collision.

FIG. 6 illustrates an example of an operation in which the collision preventing apparatus estimates a collision between objects 610 and 620 and changes a path of a vehicle 600 based on the estimated collision.

FIG. 6 illustrates the vehicle 600 including the collision preventing apparatus. In an example, the collision preventing apparatus detects the objects 610 and 620 moving around the vehicle 600. In an example, the collision preventing apparatus detects a moving speed, a moving direction, and a type of each of the objects 610 and 620. Hereinafter, it is assumed that the objects 610 and 620 are vehicles. In an example, the collision preventing apparatus determines the estimated trajectories 612 and 622 of the objects 610 and 620, respectively. In an example, the collision preventing apparatus determines the estimated trajectories 612 and 622 based on the moving direction and the moving speed of each of the objects 610 and 620. In an example, the collision preventing apparatus determines a probability that the object 610 are to follow the estimated trajectory 612 and a probability that the object 620 are to follow the estimated trajectory 622.

In an example, the collision preventing apparatus verifies whether or not the estimated trajectories 612 and 622 cross each other. In an example, the collision preventing apparatus searches for a point at which the estimated trajectories 612 and 622 cross each other. Referring to FIG. 6, the estimated trajectories cross each other at a single point, for example, a collision point 630. Because the estimated trajectories 612 and 622 cross each other at the collision point 630, the collision preventing apparatus estimates that the objects 610 and 620 corresponding to the respective estimated trajectories 612 and 622 are going to collide or intersect with each other. The collision preventing apparatus also identifies the collision point 630 at which the estimated trajectories 612 and 622 overlap.

The collision preventing apparatus verifies a probability that the objects 610 and 620 may collide with each other based on the probability that the object 610 will continue to follow the estimated trajectory 612 and the probability that the object 620 will continue to follow the estimated trajectory 622. The collision preventing apparatus may determine a time to collision (TTC) of each of the objects 610 and 620.

In an example, the collision preventing apparatus determines a collision level of each of the objects 610 and 620 based on a field of view 611 of the object 610 and a field of view 621 of the object 620. In an example, the collision preventing apparatus determines the field of view 611 corresponding to the object 610 and the field of view 621 corresponding to the object 620. In an example, the collision preventing apparatus verifies whether the object 620 is in the field of view 611 and the object 610 is in the field of view 621. Referring to FIG. 6, the collision preventing apparatus determines that the object 620 is not in the field of view 611 and the object 610 is not in the field of view 621.

In an example, the collision preventing apparatus determines the TTC based on a point in time at which the object 620 is in the field of view 611 and the object 610 is in the field of view 621. In an example, the collision preventing apparatus determines the collision level based on a distance that the objects 610 and 620 move until the point in time at which the object 620 is in the field of view 611 and the object 610 is in the field of view 621 and a braking distance of each of the objects 610 and 620 after the point in time.

In an example, the collision preventing apparatus determines the operation to be performed based on the determined collision level. That is, the collision preventing apparatus may inform each of the objects 610 and 620 of a collision risk or change a path of the vehicle 600. To inform each of the objects 610 and 620 of the collision risk, the collision preventing apparatus may sound a horn or emit a light, for example, a high beam, an emergency light, or a low beam, toward the objects 610 and 620.

When the probability that the objects 610 and 620 may collide with each other is greater than or equal to a threshold probability or the TTC of each of the objects 610 and 620 is less than a TTC threshold, the collision preventing apparatus may change the path of the vehicle 600.

In an example, the collision preventing apparatus changes the path of the vehicle 600 based on the collision point 630. FIG. 6 illustrates a first path 640 to be used by the vehicle 600 when the vehicle 600 maintains a current moving speed and a moving direction. The collision preventing apparatus verifies whether the first path 640 crosses the collision point 630 of the objects 610 and 620. Referring to FIG. 6, the vehicle 600 reaches the collision point 630 when it follows the first path 640.

In an example, the collision preventing apparatus changes the path of the vehicle 600 such that the vehicle 600 avoids the estimated collision point 630. In an example, the collision preventing apparatus determines a path to be used by the vehicle 600 using a cost function. The cost function is used to determine a total cost of the path to be used by the vehicle 600 based on a cost allocated for each point of a road. The cost allocated for each point may be determined based on whether the vehicle 600 is able to pass a point. When the vehicle 600 being unable to pass a point, a relatively high cost may be allocated to the point. The collision preventing apparatus may determine a path with a relatively small cost as the path to be used by the vehicle 600.

In the example of FIG. 6, the collision preventing apparatus allocates a relatively high cost to the estimated collision point 630. Because the relatively high cost is allocated to the collision point 630, the collision preventing apparatus generates a second path 650 that allows the vehicle 600 to avoid the collision point 630. The collision preventing apparatus controls the vehicle 600 such that the vehicle 600 follows the second path 650 to avoid the collision point 630. Thus, when the objects 610 and 620 collide with each other at the collision point 630, the vehicle 600 avoids the collision point 630 such that a secondary accident is prevented.

FIG. 7 is a diagram illustrating an example of an operation in which a collision preventing apparatus informs each of objects of a collision risk. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 is also applicable to FIG. 7, and are incorporated herein by reference. Thus, the above description may not be repeated here. It is assumed that the collision preventing apparatus determines that the estimated trajectories of a plurality of objects overlap and determines a time to collision (TTC) of each of the objects.

In an example, the collision preventing apparatus sequentially compares the determined TTC to a TTC threshold. By sequentially comparing the TTC to the TTC threshold, the collision preventing apparatus may vary an operation of informing an object of a collision risk. Hereinafter, a plurality of TTC thresholds are referred to as T1 and T2 (T1>T2).

In 710, the collision preventing apparatus compares the TTC to T1. When the TTC exceeds T1, the collision preventing apparatus collects temporal data of the objects without performing any additional operation.

In 720, when the TTC is less than or equal to T1, the collision preventing apparatus compares the TTC to T2. When the TTC exceeding T2, the TTC is less than T1 and greater than T2.

In 740, when the TTC exceeds T2, the collision preventing apparatus sounds a horn for a period of time. In an example, the period of time is relatively short. That is, the period of time for sounding the horn may be set to be less than or equal to a threshold time for sounding the horn.

In 730, when TTC is less than or equal to T2, the collision preventing apparatus continuously sounds the horn. That is, the period of time for sounding the horn may be set to be greater than or equal to the threshold time for sounding the horn.

In 750, the collision preventing apparatus verifies whether at least one of the objects changes a path based on whether at least one of the objects is not following an estimated trajectory.

When at least one of the objects changes its path or is not following the estimated trajectory, the estimated trajectories may no longer overlap. When the estimated trajectories no longer overlap, the collision preventing apparatus may stop the sounding of the horn. When each of the objects do not change their path and continue to follow the estimated trajectory, the collision preventing apparatus may continue to sound the horn. That is, the collision preventing apparatus may continuously inform the objects of a collision risk until at least one of the objects does not follow the estimated trajectory. Although not illustrated, when each of the objects do not change the path and continue to follow the estimated trajectory, the collision preventing apparatus may change a path of a vehicle based on a collision point.

The collision preventing apparatus and other apparatuses, units, modules, devices, and other components are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD).

The methods illustrated in FIGS. 3, 5, and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, or an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of preventing a collision, the method comprising:
    tracking plural objects located in a vicinity of a vehicle based on data collected from a sensor in the vehicle;
    determining respective trajectories of the plural objects;
    verifying a collision level of collision between the plural objects based on the determined respective trajectories; and
    performing a collision prevention operation based on the collision level.

2. The method of claim 1, wherein the determining comprises determining the respective trajectories based on a corresponding moving path of each of the plural objects obtained by the tracking of the plural objects and a curvature of a road on which the plural objects are located.

3. The method of claim 1, wherein the verifying comprises verifying the collision level based on whether trajectories of at least two objects of the plural objects overlap.

4. The method of claim 1, wherein the verifying comprises verifying the collision level based on a probability that each of the plural objects is to follow a corresponding trajectory.

5. The method of claim 1, wherein the performing of the collision prevention operation based on the collision level comprises:
    determining a field of view of each of the plural objects; and
    informing a first object of the plural objects of a collision risk based on whether a second object of the plural objects is present in a determined corresponding field of view of the first object.

6. The method of claim 5, wherein the performing of the collision prevention operation based on the collision level comprises:
    determining a time to collision (TTC) between the first object and the second object, in response to the second object not being in each of the determined field of view of the first object; and
    changing a path of the vehicle or informing each of the plural objects of the collision risk based on the determined TTC.

7. The method of claim 1, wherein the performing of the collision prevention operation based on the collision level comprises:
    informing the plural objects of a collision risk;
    determining, based on the sensor data, whether an object of the plural objects does not follow a determined corresponding trajectory, in response to the plural objects being informed of the collision risk; and
    discontinuing the informing of the plural objects of the collision risk, in response to the object not following the determined corresponding trajectory.

8. The method of claim 1, wherein the performing of the collision prevention operation based on the collision level comprises any one or any combination of changing a path of the vehicle based on the collision level or informing an object of the plural objects of a collision risk.

9. The method of claim 8, wherein the changing of the path of the vehicle comprises changing the path of the vehicle based on a point at which trajectories of at least two objects of the plural objects intersect.

10. A collision preventing apparatus comprising:
    a processor configured to
    track plural objects located in a vicinity of a vehicle based on data collected from a sensor in the vehicle,
    determine respective trajectories of the plural objects,
    verify a collision level of collision between the plural objects based on the determined respective trajectories, and
    perform a collision prevention operation based on the collision level.

11. The collision preventing apparatus of claim 10, wherein the processor is further configured to verify the collision level based on whether trajectories of at least two objects of the plural objects overlap.

12. The collision preventing apparatus of claim 10, wherein the processor is further configured to:
   determine a field of view of each of the plural objects,
   determine whether a first object of the plural objects detects a second object of the plural objects based on the determined fields of view, and
   inform each of the plural objects of the collision risk in response to the first object being unable to detect the second object.

13. The collision preventing apparatus of claim 10, wherein the processor is further configured to change a path of the vehicle to avoid a point at which trajectories of at least two objects of the plural objects intersect.

14. A method of preventing a collision, the method comprising:
   obtaining locations, at different times, of plural objects located in a vicinity of a vehicle from a sensor in the vehicle;
   determining trajectories of the plural objects based on the obtained locations of the plural objects;
   determining a collision risk for collision between the plural objects by verifying whether at least two of the trajectories intersect;
   determining a time to collision (TTC) of each of the plural objects, in response to the at least two trajectories intersecting; and
   informing the plural objects of the collision risk based on the determined TTC.

15. The method of claim 14, wherein the determining of the TTC comprises determining the TTC in response to an object corresponding to any of the at least two trajectories being unable to detect another object corresponding to any of the at least two trajectories.

16. The method of claim 14, wherein the informing the plural objects of the collision risk comprises determining whether to inform each of the plural objects of the collision risk by comparing the determined TTC to a TTC threshold.

17. The method of claim 14, further comprising:
   changing a path of the vehicle in response to the TTC being less than or equal to a TTC threshold.

18. The method of claim 14, wherein the verifying comprises verifying whether a portion of the at least two of the trajectories overlap based on a braking distance and a speed of each of the plural objects corresponding to the at least two trajectories.

19. The method of claim 14, further comprising:
   determining whether an object corresponding to any of the at least two trajectories has changed its path; and
   terminating the informing of the plural objects, in response to the path being changed.

20. A non-transitory computer-readable medium storing instructions that, when executed by a processor, cause the processor to perform the method of claim 14.

* * * * *